US007594167B1

(12) United States Patent
Fuchs et al.

(10) Patent No.: US 7,594,167 B1
(45) Date of Patent: *Sep. 22, 2009

(54) SYSTEM AND METHOD FOR SCHEMA EVOLUTION IN AN E-COMMERCE NETWORK

(75) Inventors: Matthew Fuchs, Los Gatos, CA (US); Jari Koistinen, Palo Alto, CA (US); Davidson Andrew, Boulder Creek, CA (US)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/493,517

(22) Filed: Jan. 28, 2000

Related U.S. Application Data

(63) Continuation-in-part of application No. 09/173,854, filed on Oct. 16, 1998, now Pat. No. 6,125,391.

(51) Int. Cl.
*G06F 15/00* (2006.01)
*G06F 15/167* (2006.01)
*G06Q 30/00* (2006.01)

(52) U.S. Cl. .................... 715/234; 715/205; 715/255; 709/203; 705/26

(58) Field of Classification Search ............... 715/513, 715/501.1, 200, 201, 205, 234, 202, 253, 715/254, 255, 256, 273, 713, 760; 700/100; 705/26, 23; 709/203, 201, 213; 797/10
See application file for complete search history.

(56) References Cited

U.S. PATENT DOCUMENTS

| 5,692,129 | A | * | 11/1997 | Sonderegger et al. ... 707/103 R |
| 5,790,677 | A | | 8/1998 | Fox et al. |
| 5,974,418 | A | * | 10/1999 | Blinn et al. ................. 707/100 |
| 6,009,543 | A | * | 12/1999 | Shavit ......................... 712/200 |
| 6,049,785 | A | | 4/2000 | Gifford |
| 6,119,130 | A | * | 9/2000 | Nguyen et al. ............... 707/203 |
| 6,125,391 | A | * | 9/2000 | Meltzer et al. ............... 709/223 |
| 6,154,738 | A | * | 11/2000 | Call .............................. 707/4 |
| 6,216,136 | B1 | * | 4/2001 | Ronstrom ................... 707/203 |
| 6,216,137 | B1 | * | 4/2001 | Nguyen et al. ............... 707/203 |
| 6,226,788 | B1 | * | 5/2001 | Schoening et al. .......... 717/107 |

(Continued)

FOREIGN PATENT DOCUMENTS

EP 954799 * 8/2001

OTHER PUBLICATIONS

Usdin et al. "XML: Not a Silver Bullet, But a Great Pipe Wrench", StandardView, vol. 6, No. 3, Sep. 1998, pp. 125-132.*

(Continued)

*Primary Examiner*—Laurie Ries
*Assistant Examiner*—Maikhanh Nguyen
(74) *Attorney, Agent, or Firm*—Ernest J. Beffel, Jr.; Haynes Beffel & Wolfeld, LLP

(57) ABSTRACT

A method and computer system are described for conducting commercial transactions. An enhanced type of XML schema may be used which supports integrity constraints and polymorphism. Schemas are identified by the use of Uniform Resource Names. XML processors residing on transaction servers or trading partner servers parse document instances by retrieving the URNs corresponding to the schemas used to interpret the document. The URNs are converted to location-dependent URIs in order to locate the schemas. URNs are resolved to location-dependent URIs by use of the LDAP protocol. URNs may be converted to LDAP URLs which are used to search LDAP compliant directories. The directories serve as registries for the URI values corresponding to the URNs.

9 Claims, 4 Drawing Sheets

U.S. PATENT DOCUMENTS

| | | | |
|---|---|---|---|
| 6,286,010 B1* | 9/2001 | Ramachandran et al. | 707/103 R |
| 6,393,466 B1* | 5/2002 | Hickman et al. | 709/214 |
| 6,401,101 B1* | 6/2002 | Britton et al. | 707/103 X |
| 6,418,441 B1* | 7/2002 | Call | 707/10 |
| 6,418,446 B1* | 7/2002 | Lection et al. | 707/103 R |
| 6,480,860 B1* | 11/2002 | Monday | 707/102 |
| 6,490,619 B1* | 12/2002 | Byrne et al. | 709/223 |
| 6,501,491 B1* | 12/2002 | Brown et al. | 715/853 |
| 6,564,370 B1* | 5/2003 | Hunt | 717/122 |
| 6,591,260 B1* | 7/2003 | Schwarzhoff et al. | 707/2 |
| 6,601,071 B1* | 7/2003 | Bowker et al. | 707/102 |
| 6,618,852 B1* | 9/2003 | van Eikeren et al. | 717/108 |
| 6,654,726 B1* | 11/2003 | Hanzek | 705/26 |
| 6,684,204 B1* | 1/2004 | Lal | 707/3 |
| 6,792,605 B1* | 9/2004 | Roberts et al. | 719/313 |
| 6,904,449 B1* | 6/2005 | Quinones | 709/203 |
| 7,028,312 B1* | 4/2006 | Merrick et al. | 719/330 |

OTHER PUBLICATIONS

Glushko et al. "An XML Framework for Agent-based E-commerce", Communications of the ACM, vol. 42, No. 3, Mar. 1999, pp. 106-113.*

Meltzer et al. XML and Electronic Commerce: Enabling the Network Economy, Sigmod Record, vol. 27, No. 4, Dec. 1998, pp. 21-28.*

James Tauber, "XML After 1.0: You Ain't Seen Nothin' Yet", IEEE Internet Computing, Jun. 1999, pp. 100-102.*

Don Kiely, "BizTalk Could Spur XML And E-Business", Information Week, Aug. 1999, p. 74 (2 pages).*

PR Newswire, "Symix Publishes XML Schema for Collaboration-Critical Midmarket Transactions to BizTalk.org", Nov. 1999, p. 1.*

Jay M. Tenenbaum et al., "eCo System: CommerceNet's Architectural Framework for Internet Commerce", Jan. 1997, pp. 1-42.*

Sven-Eric Lautemann, "A Propagation Mechanism for Populated Schema Versions", IEEE, 1997, pp. 67-78.*

Jacobsen et al. "Modeling Interface Definition Language Extensions," Proceedings 37th International Conference on Technology of Object-Oriented Languages and Systems, 2000, pp. 242-251.*

S. Hirshfield, "Object-Oriented Programming," ACM Computing Surveys, vol. 28, No. 1, Mar. 1996, pp. 253-255.*

Battle et al., "Flexible Information Presentation with XML," The Institution of Electrical Engineers, Jan. 1999, pp. 13/1-6.*

F. Riggins et al., "Toward a Unified View of Electronic Commerce," Communications of the ACM, Oct. 1998, vol. 41, No. 10, pp. 88-95.*

J. Schafer et al., "Recommender Systems in E-Commerce", ACM, Nov. 1999, pp. 158-166.*

S. Bolin, "E-commerce: A Market Analysis and Prognostication", ACM, Sep. 1998, pp. 97-105.*

X. Li, "A Survey of Schema Evolution in Object-Oriented Databases", IEEE, Sep. 1999, pp. 362-371.*

O. Liechti et al., "Structured graph format: XML metadata for describing Web site structure", Computer Networks and ISDN Systems, 1998, pp. 11-21.*

Y. Ra et al., "A Transparent Schema-Evolution System Based on Object-Oriented View Technology," IEEE, vol. 9, No. 4, Jul.-Aug. 1997, pp. 600-624.*

S. Osborn, "The Role of Polymorphism in Schema Evolution in an Object-Oriented Database," IEEE Transactions on Knowledge and Data Engineering, vol. 1, No. 3, Sep. 1989, pp. 310-317.*

Tenenbaum et al., "Eco System: An Internet Commerce Architecture," IEEE, May 1999, pp. 48-55.*

Glushko et al., "An XML Framework For Agent-based E-commerce," ACM, Mar. 1999, pp. 1-9.*

Guidelines for Using XML for Electronic Data Interchange: Version 0.02; Editor: Martin Bryan, The SGML Centre; Sep. 12, 1997.*

Jacobsen et al., "Modeling Interface Definition Language Extensions," Proceedings 37th International Conference on Technology of Object-Oriented Language and Systems, Tools-Pacific 2000, IEEE, pp. 242-251.*

Pons, et a., "Schema Evolution in Object Databases by Catalogs," Database Engineering and Applications Symposium, 1997, IEEE, pp. 368-375.*

Zhou et al., "Schema Evolution of an Object-Oriented Real-Time Database System for Manufacturing Automation," IEEE Transactions on Knowledge and Data Engineering, vol. 9, No. 6, Nov./Dec. 1997, pp. 956-977.*

Editors: Dan Brickley and R.V. Guha, "Resource Description Framework (RDF) Schema Specification", W3C Proposed Recommendation Mar. 3, 1999, W3C XP-002203858, available at http://www.w3.org/TR/1999/PR-rdf-schema-19990303, 1-29.

Editors: David Beech et al., "XML Schema Part 1: Structures", W3C Working Draft May 6, 1999, W3C XP-002203859, available at http://www.w3.org/1999/05/06-xmlschema-1, 1-53.

Editors: Paul V. Biron and Ashok Malhotra, "XML Schema Part 2: Datatypes", World Wide Web Consortium Working Draft May 6, 1999, W3C XP-002203860, available at http://www.w3.org/1999/05/06-xmlschema-2, 1-28.

Kent Brown, "BizTalk: Fluent in E-Business", XP-002203861, 1-6, Dec. 1999.

W. Yeong, T. Howes, S. Kille, "Lighweight Directory Access Protocol", ISODE Consortium, Mar. 1995, 1-19.

R. Moats, "URN Syntax", AT&T, May 1997, 1-7.

Nils Klarlund, Anders Moller, Michael I. Schwartzbach, "Document Structure Description 1.0", AT&T and Brics 1999, XP-002203865, 1-34.

K. Narayanaswamy, K.V. Bapa Rao, "An Incremental Mechanism for Schema Evolution in Engineering Domains", IEEE 1988, 294-300.

Editors: Tim Bray, Jean Paoli, C.M. Sperberg-McQueen, "Extensible Markup Language (XML)", World Wide Web Consortium Dec. 8, 1997, W3C XP-002203864, available at http://www.w3.org/TR/PR-xml-971208, 1-32.

A. Davidson, M. Fuchs, M. Hedlin, M. Jain, J. Koistinen, C. Lloyd, M. Malone, K. Schwarzhof, "Schema for Object-Oriented XML 2.0", W3C Note Jul. 30, 1999, W3C XP-002203857, available at http://www.w3/org/1999/07/NOTE-SOX-19990730, 1-22.

F. Bergeron and L. Raymond, "Managing EDI for corporate advantage: A longitudinal study," Information & Management, 31, 1997, pp. 319-333, Elsevier.

Robert J. Bonometti, Raymond W. Smith, and Patrick E. White, "The Walls Coming Down: Interoperability Opens the Electronic City," The Future of the Electronic Marketplace, The MIT Press, Cambridge, Massachusetts, 1998, pp. 265-301.

Richard Bort and Gerald R. Bielfeldt, "EDI on the Internet," Handbook of EDI, 1997, pp. B7-1-B7-19, Warren, Gorham & Lamont, USA.

David Chappell, "Simple Object Access Protocol (SOAP)," Microsoft Windows: Simple Object Access Protocol Technical Article, Sep. 10, 1999, Microsoft Corporation.

P. Emerald Chung, Yennun Huang, Shalini Yajnik, Deron Liang, Joanne C. Shih, Chung-Yih Wang, and Yi-Min Wang, "DCOM and CORBA Side by Side, Step by Step, and Layer by Layer," Can be found at:http://www.cs.west/edu/schmidt/submit/Paper.html.

Isabel Gallego, Jaime Delgado, and José J. Acebrón, "Distributed Models for Brokerage on Electronic Commerce," TREC'98, LINCS 1402, 1998, pp. 129-140, Springer-Verlag Berlin Heidelberg.

John J. Garguilo and Paul Markovitz, "Guidelines for the Evaluation of Electronic data Interchange Products," DRAFT—Technical Report CAML/CLS, Dec. 6, 1995, Gaithersburg, MD, USA.

Shikhar Ghosh, "Making Business Sense of the Internet," Harvard Business Review, Mar.-Apr. 1998, pp. 126-135.

Timothy A. Howes and Mark C. Smith, "A Scalable, Deployable, Directory Service Framework for the Internet," Apr. 28, 1995. Can be found at: http://info.isoc.org/HMP/PAPER/173/html/paper.html.

Li-Pheng Khoo, Shu Beng Tor, and Stephen S. G. Lee, "The Potential of Intelligent Software Agents in the World Wide Web in Automating Part Procurement," International Journal of Purchasing and Materials Management, Jan. 1998, pp. 46-52.

Frederick J. Riggins and Hyeun-Suk (Sue) Rhee, "Toward a Unified View of Electronic Commerce," Communications of the ACM, Oct. 1998, vol. 41, No. 10, pp. 88-95.

"Resource Description Framework (RDF) and Syntax [sic] Specification", Feb. 22, 1999; on Aug. 30, 2006.

"Resource Description Framework (RDF) Schema Specification", 1998; on Aug. 30, 2006.

Sall, Kenneth B., "XML Family of Specifications—A Practical Guide", Chapter 16 (RDF: Resource Description Framework), pp. 1029-1059, Pearson Education, Inc. 2002.

Resource Description Framework (RDF): Concepts and Abstract Syntax, § 3.1 Graph Data Model, (W3C working draft Jan. 23, 2003—not a prior art publication), on Aug. 30, 2006.

RDF Model Theory, § 3.1 RDF Interpretations, Figure2: An Example of an rdf-interpretation (W3C working draft Apr. 29, 2002), on Aug. 30, 2006.

* cited by examiner

SYSTEM AND METHOD FOR SCHEMA EVOLUTION IN AN E-COMMERCE NETWORK

PRIORITY INFORMATION

The present application claims priority as a continuation-in-part of U.S. patent application Ser. No. 09/173,854 filed 16 Oct. 1998, now U.S. Pat. No. 6,125,391 A entitled MARKET MAKERS USING DOCUMENTS FOR COMMERCE IN TRADING PARTNER NETWORKS, which remains pending in the continuation U.S. patent application Ser. No. 09/633,365 filed on 7 Aug. 2000 entitled MARKET MAKERS USING DOCUMENTS FOR COMMERCE IN TRADING PARTNER NETWORKS.

CROSS REFERENCE TO RELATED APPLICATIONS

The present application is related to the commonly assigned, issued U.S. Pat. No. 6,591,260, filed on 28 Jan. 2000, entitled METHOD OF RETRIEVING SCHEMAS FOR INTERPRETING DOCUMENTS IN AN ELECTRONIC COMMERCE SYSTEM, by inventors Kelly Schwarzhoff and Ramshankar Venkat.

BACKGROUND OF THE INVENTION

1. Field of the Invention

This invention relates to the exchange of electronic documents in an electronic marketplace. In particular, the invention relates to methods for extending schemas which are used to interpret electronic documents used in business to business transactions.

2. Description of the Related Art

Techniques exist for supporting the exchange of electronic data between trading partners. A prominent and commonly used standard is Electronic Data Interchange, more commonly referred to by its acronym EDI. EDI refers to a set of messages used for business-to-business communication. The messages are compiled into business documents, which are exchanged to facilitate transactions between trading partners.

Each organization using EDI typically stores its data in a private format. As such, trading partners employing EDI are typically required to contract in advance and develop software programs to map between their private data sets. Each time a new trading partner is added to a client list, a new translation program is required to format their data in conformance with the other trading partners on the list.

The EDI approach for supporting a commercial communications standard is to include the union of all universally required features into a global standard. EDI effectively includes a messaging standard for each transaction conducted between each set of trading partners. The inefficiencies which result from this system include the effort spent in generating a translator for every pair of trading partners and the redundancy inherent in generating original documents to facilitate largely similar transactions.

Techniques also exist for facilitating the safe evolution of code distributed over computer networks. Examples of such technologies include communication systems for distributed objects such as CORBA, DCOM, and SOAP. These systems allow communication and collaboration amongst objects distributed over networks. As such, they support object-oriented facilities such as inheritance and polymorphism, which enable objects to be modified safely and efficiently. However, these systems comprise interfaces between objects which are implemented in programming languages, rather than schema languages for encoding electronic documents distributed over computer networks.

Accordingly, it is desirable to establish an effective communications standard for encoding electronic documents. This standard should allow document types to evolve in order to facilitate new transactions, while preserving the integrity of the existing document types and the transactions they support. Because the library of document types which are used in such a standard will be shared by all trading partners in the marketplace, these resources should be available throughout the marketplace.

SUMMARY OF THE INVENTION

The invention enables the creation of an electronic marketplace by facilitating the exchange of electronic documents between trading partners. Embodiments of the invention include communications standards for the electronic documents which enable trading partners to (1) construct documents which reflect the particular constraints of their transactions and (2) make such documents easily available throughout the marketplace. The communications standards employed in this invention optimize the efficiency of the creation and retrieval of the electronic documents, and, as such, the efficiency of the respective transactions.

In an embodiment of the invention, commercial transactions between trading partners are conducted via a computer network referred to as a transaction services network. The transaction services network is operated by a market maker interested in supporting an electronic marketplace, and the network provides services which facilitate the commercial transactions. The transactions are conducted by the exchange of electronic documents between trading partners. The transaction services network provides services for facilitating these transactions, such as matching trading partners to conduct certain types of transactions; routing documents between trading partners; providing information about trading partners; and establishing protocols to govern the transactions. The trading partners access the transaction services network via private servers which connect to the transaction services network via the Internet.

In embodiments of the invention, the documents supporting the transactions are written in an enhanced form of the Extensible Markup Language, XML. The XML standard is a markup language which allows document writers to define the elements, or "tags" which are used to express document instances. The ability to define the tags which are used in a document provides document writers with the facility to convey the semantic content of document instances by use of the tags embedded within the document instances, a feature which is unavailable in earlier generations of markup languages.

XML document instances are interpreted by the use of schemas which are cited in the document instances; the schemas define a collection of tags which are used to encode the document instances. As a schema may be used to interpret multiple document instances, the schema classifies a document type. The document types which are available in the invention support commercial transactions such as purchase orders, purchase order acknowledgements, order status checks, availability checks, price checks, invoices, and invoice acknowledgements. XML allows document writers to create schemas as necessary to support novel transactions.

Embodiments of the invention also introduce aspects of object-oriented programming into XML. Some embodiments of the invention include mechanisms for extending document types, so that a document type can be explicitly defined as an extension of a pre-existing document type. In embodiments of the invention, a first element defined in a first schema may be extended by defining a second element in a second schema, wherein the second element extends the definition of the first element. In some embodiments of the invention, the first element may comprise a plurality of sub-elements, and the extended element may comprise the plurality of sub-elements with one or more additional sub-elements. In embodiments of the invention, the first and second schemas may reside on separate servers on the transaction services network.

Embodiments of the invention also support polymorphism. In such embodiments, an instance document may be a legal instance of more than one document type. Some embodiments of the invention support polymorphism with type extension. In such embodiments, any document instance of an extending document type will also be a legal instance of the extended document type.

In embodiments of the invention, a document instance may import a first schema and a second schema, wherein the first schema defines a first element, and the second schema defines a second element that extends the definition of the first element. In some embodiments, the second element may be cited in the document instance in any context reserved for the first element. In embodiments of the invention, the first schema and second schema may reside on separate servers on a transaction services network.

The extension mechanisms supported in the invention enable the safe evolution of schemas supported on the transaction services network. Applications that are implemented to handle documents of a specific type can also handle documents of any types that are extensions of the original type. Thus the extension mechanisms allow the introduction of new document types or the extension of existing document types while preserving the integrity of existing applications. This feature enables document types and applications to evolve separately.

In an embodiment of the invention, the document instances contain identifiers for the schemas they cite. These identifiers are persistent and location independent. As such, the identifiers enable schemas to be identified irrespective of changes in the configuration of the underlying computer system. In some embodiments, the location identifiers are Uniform Resource Names (URNs).

In embodiments of the invention, URNs for schemas are resolved to location-dependent Uniform Resource Identifiers, or URIs, which indicate the locations for the schemas. These locations may include HTTP sites, FTP sites, or file locations. In embodiments of the invention URNs are resolved to location-dependent URIs by the use of a registry which maps URNs to the location dependent URIs.

In embodiments of the invention, the Lightweight Directory Access Protocol, version 3 (LDAP v3) is used to search the registry for the location-dependent URI. This protocol provides an efficient tool for searching the registry and locating the location-dependent URIs. The URN registry is stored in an LDAP v3 compliant directory server. The LDAP compliant directory server may be an x.500 server. In some embodiments, the URN is converted to an LDAP URL. The LDAP URL is used as a key to search the LDAP directory for the location-dependent URI. In an embodiment of the invention, the directory server is accessible to any trading partner server or other server on the network which interprets XML documents. The use of a central directory server eliminates the need for replicated repositories, thereby lending scalability and consistency to the URN registry. In an alternative embodiment, the registry may be federated, so that different nodes of the directory reside on separate servers, thereby allowing control over particular URNs to be vested with the parties responsible for the resources identified by the URNs.

DETAILED DESCRIPTION

A. Introduction

The invention addresses problems faced in the construction of an electronic marketplace for business to business transactions. In particular, the electronic marketplace considered by the invention includes a computer network system which facilitates transactions between trading partners; these transactions are conducted by the exchange of electronic documents which correspond to the particular transactions. For example, a purchase order from a seller to a buyer may be conducted by exchanging a PurchaseOrder document between the trading partners which specifies the terms of the transaction. The types of commercial transactions supported by the invention can include, but are not limited to, purchase orders, purchase order acknowledgments, order status checks, availability checks, price checks, invoices, invoice acknowledgement, and/or catalog documents.

Various services are required to facilitate such business to business electronic transactions. For instance, buyers and sellers may be matched to conduct certain types of transactions; documents are routed between trading partners; information about trading partners should be readily available; and protocols should be established to govern the transactions. Moreover, a market system which facilitates commercial transactions should be scalable, as a system flexible enough to support a multitude of transactions should allow for trading partners to be continuously added to the marketplace.

B. Overview of the Electronic Marketplace

Figure 1:
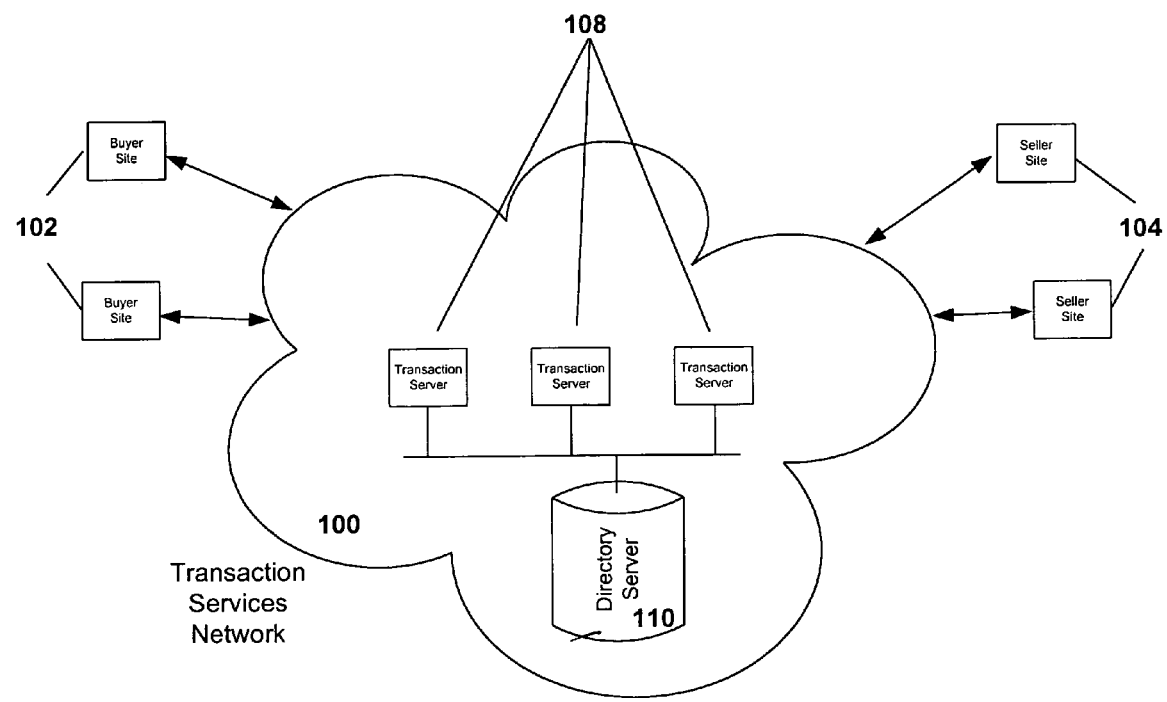
FIG. 1 is a schematic depiction of the network layout of the electronic marketplace in an embodiment of the invention.

In an embodiment of the invention, these services are provided by a network of computers illustrated in FIG. 1. The network providing the services 100 is referred to as a transaction services network 100; the transaction services network is typically operated by a "market maker", i.e., a body which is interested in facilitating an electronic marketplace. Buyer sites 102 and seller sites 104 connect to the transaction services network 100 via the Internet. The network includes a group of transaction servers 108 which provide various commercial services. Transaction servers 108 may be added to the network as necessary, thereby lending scalability to the transaction services network 100.

Previous attempts at establishing electronic marketplaces have lacked an adequate standard for communication between trading partners. This deficiency results in the generation of redundant documents, and fails to provide efficient tools for constructing new transactions from old documents. As such, it would be desirable to enforce a communications standards within the marketplace which expedites the modification of existing documents and eliminates redundancy in the collection of documents, while retaining the flexibility to accommodate novel transactions.

C. XML as the Basis of a Commercial Communication Standard

It is desirable to establish a communication standard for encoding the transactions which are conducted in the electronic marketplace. The standard should be flexible and expressive enough to encode any possible transaction between trading partners. The standard should also enable the efficient creation of new transactions from old transactions, and thereby eliminate the need to create and interpret redundant messages in the electronic marketplace.

In an embodiment of the invention, the transactions are encoded in documents written in markup languages. These documents are exchanged between trading partners to facilitate transactions in the marketplace. Documents written in a markup language are interpreted by the use of embedded tags; examples of such languages include HTML and SGML.

In an embodiment of the invention, the markup language used to write the electronic documents is an enhanced version of XML. Standard XML is a markup language which allows a document writer to define the set of tags which are used to interpret a given document "instance". The collection of tags are defined in a file referred to as a "schema", and every instance of an XML document is interpreted by reference to the schemas cited by the instance. Because a schema defines a collection of tags which may be used to interpret multiple document instances, a schema is said to define a "document type". Correspondingly, an instance of a document type comprises an XML document which cites the respective schema. In standard XML, schemas are defined in Document Type Definition files, or DTDs. A DTD may be external or internal to the respective document instance.

XML document instances are checked at two levels: each document is checked for (1) conformance to XML syntax and (2) validity with respect to referenced schemas. This distinction can be illustrated by example. Consider a specific purchase order document instance of the document type PurchaseOrder. Suppose we have a document type PurchaseOrder and an instance of PurchaseOrder that we call PO_Instance. PO_Instance would be a specific purchase order sent through the marketplace. If PO_Instance conforms to a set of general syntactical criteria specified by standard XML we say that PO_Instance is "well-formed." If, in addition, PO_Instance is correct with respect to PurchaseOrder we say that PO_Instance is "valid" with respect to PurchaseOrder. Validity is a stricter requirement than well-formedness, as a document instance can be well-formed even though it is not valid with respect to its document type.

In an embodiment of the invention, the XML document instances are parsed in an XML Processor. The XML Processor is an application which is responsible for understanding well-formed XML syntax and for validating XML documents. In an embodiment of the invention, each transaction server and each trading partner site may have an XML Processor, which allows each server to understand the documents exchanged within the marketplace.

Standard XML alone, however, is not entirely adequate to facilitate the electronic marketplace. Amongst the deficiencies of standard XML as an e-commerce protocol is that the language does not provide adequate means for checking integrity constraints on data. Moreover, conventional XML does not support polymorphic changes to schemas. As such, schemas must be entirely rewritten to accommodate minor changes to conventional transactions which have pre-existing schemas. Moreover, the changes to the schemas would have a global impact on applications that create and process document instances.

The absence of polymorphism results in duplicated effort to create largely redundant schemas. This deficiency can be illustrated by example. Consider a transaction such as a purchase order. Each individual seller in the marketplace is likely to have constraints or extensions on purchase orders which are unique to its business, and which should be reflected in any purchase order which it communicates to a buyer. Because standard XML does not allow polymorphic changes to existing schemas, each buyer in this example will have to write a purchase order schema to reflect their transaction constraints. This results in duplicated effort, and a multiplicity of largely similar schemas. As such, the invention includes enhancements to XML which resolve these deficiencies.

D. Enhanced XML and Polymorphic Schemas

In embodiments of the invention, the standard XML schemas are extended with an enhanced schema language which supports polymorphism and integrity constraints in XML Documents. Non-limiting examples of enhanced XML schema languages include Commerce One's SOX language and Microsoft's XDR standard.

Embodiments of the invention support type extensions. In such embodiments, the enhanced schema language allows document types to be explicitly defined as extensions of pre-existing document types. As such, the enhanced schema language allows the creation of an extension hierarchy of document types. Alternative embodiments of the invention also support polymorphism, so that an instance of a document type T may also be a legal instance of a document type T'.

Embodiments of the invention combine type extensions with polymorphism. In such embodiments, applications that are implemented to handle documents of a specific type T can also handle documents of any types that are extensions of the type T. Thus, by combining type extensions with polymorphism, the schema language allows type safe extensions in runtime. As such, the combination of these features decouples the evolution of document types and applications, which is desirable on a widely deployed transaction services network.

Figure 2:
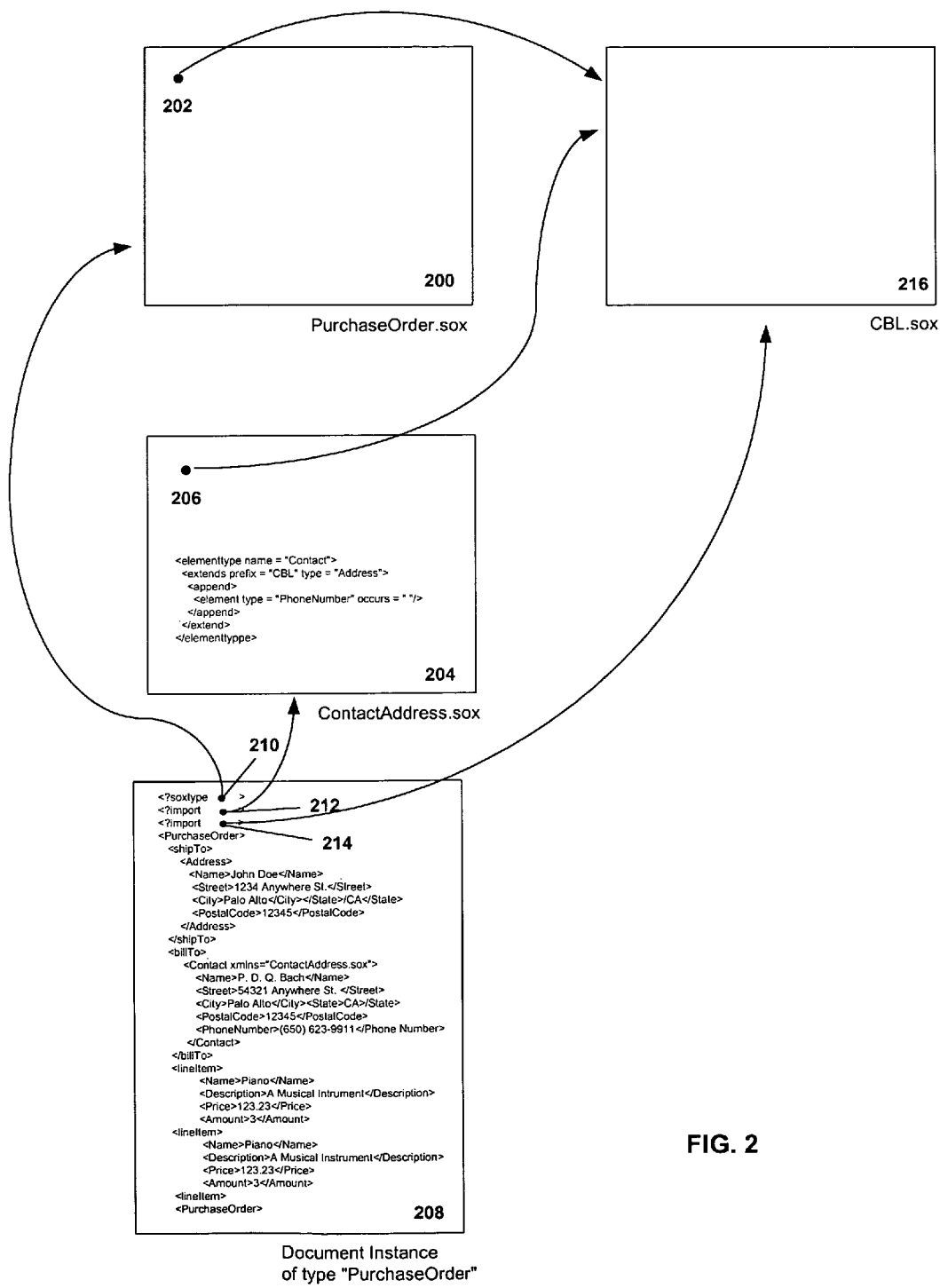
FIG. 2 illustrates the use of URNs for dynamically linking XML schemas and document instances in an embodiment of the invention.

The utility of polymorphic schemas in the electronic marketplace can be illustrated with an example depicted in FIG. 2. Note that while the schema language employed in this illustration is the SOX language, the example is equally valid for any enhanced schema language supporting polymorphism in XML. Assume that a group of trading partners have agreed on a schema for the document type PurchaseOrder. The schema corresponding to the document type is the PurchaseOrder.sox 200 schema. PurchaseOrder.sox 200 references tags from a preexisting library of SOX components in a file called CBL.sox 216; the acronym CBL stands for "Common Business Library." The PurchaseOrder.sox schema 200 includes an identifier 202 for CBL.sox 216. CBL.sox 216 includes a tag <Address> for supporting addresses. The <Address> tag has as sub-elements:

<Name>
<Street>
<City>
<PostalCode>

Suppose that <Address> is utilized by document instances of type PurchaseOrder and that a particular trading partner ACME wishes to make a simple extension to the <Address> element used in PurchaseOrder.sox 200. In particular, ACME wishes to extend the PurchaseOrder.sox 200 schema to allow the <Address> element to contain telephone numbers. As illustrated below, the present invention enables such an extension of the <Address> tag; the polymorphism feature allows the extended <Address> tag to be used in instance documents of type PurchaseOrder, while preserving the integrity of the PurchaseOrder.sox schema and the existing instance documents of that type.

The <Address> tag may be extended by using the SOX schema language to create a small document type ContactAddress, whose corresponding schema ContactAddress.sox 204 extends the CBL.sox 216 definition of <Address> to include a telephone number. The extended tag, or element, is referred to as <Contact>, and this element is defined in ContactAddress.sox, which is given as follows:

```
<schema uri="ContactAddress.sox">
  <namespace prefix="CBL" uri="CBL.sox"/>
  <elementtype name="Contact">
    <extends prefix="CBL" type="Address">
      <append>
        <element type="PhoneNumber" occurs="*"/>
      </append>
    </extend>
  </elementtype>
</schema>
```

The new document type ContactAddress includes an identifier 206 for CBL.sox 216. A document instance 208 of type PurchaseOrder incorporates the new <Contact> tag by import statements which reference the schemas ContactAddress.sox 204 and CBL.sox 216 respectively. Note that the <Contact> tag may be used in any place in the document instance reserved for the original <Address> tag.

The benefits of polymorphism are apparent from this example: we have extended the <Address> tag to create the <Contact> tag by writing a new, short document type ContactAddress. Thus the new document type ContactAddress extends the functionality of the original PurchaseOrder document type while preserving the integrity of PurchaseOrder.

Without support for polymorphism, extensions to the <Address> tag would require a rewrite of the PurchaseOrder. This would alter a fundamental document type which is an agreed upon standard amongst trading partners, one upon which a number of document instances and transactions are constructed, in order to accommodate a minor change. As a result, either (1) every trading partner would have to agree on the new PurchaseOrder, and software would need to be rechecked to ensure compliance with the new definition, or (2) the new schema would have a different name, and each time a trading partner wishes to send a purchase order, they would need to ensure whether the other partner supports the new PurchaseOrder or would need a translation to the old version.

To support polymorphism, the schemas should have the following characteristics:

The schemas should be available in a generally available repository to enable trading partners to retrieve them dynamically. The schema identifiers 202 206 210 212 214 should have globally unique names, aiding their dynamic discovery and loading When a trading partner receives a document instance, the <?import . . . > statement lists the schemata required to correctly parse it. As such, the recipient should be able to follow the identifiers 212 214 following the import statements in a document instance 208 to dynamically load the new schemata As such, the enhanced schema languages introduce new challenges to the implementation of a document exchange system. One of these challenges arises from the fact that the schemas in such languages evolve. To facilitate an e-commerce document exchange system, documents which are written prior to schema modifications should be able link at the time they are parsed to the modified schema. As the revised schema may reside in a different physical location in the document exchange system, the link to the schema in the document instance, which was written prior to the schema change, should remain valid. As such, the use of polymorphic documents within the document exchange system entails a need for permanent, location independent identifiers for schemas.

E. Modularity and the Use of Persistent, Location-Independent Identifiers

It is also desirable for XML entities to exhibit modularity, i.e., to allow XML entities to be re-used. To illustrate the desirability of this feature, suppose there is an XML document schema which is well-understood, and which defines tags that may be used in multiple document instances. If such a schema is available, it is desirable to re-use this schema in the multiple instances, rather than re-write it for each instance.

In order to re-use a schema in multiple document instances, it is desirable for the schema to have a universal name, which may be used by any of the document instances referring to the schema. This name should also be persistent, so that document instances referring to the schema remain valid indefinitely. Additionally, it is desirable for such names to be location-independent, so that references to the schema remain valid even if the schema locations change. Thus the modularity of XML code also suggests a need for persistent, location-independent identifiers for XML entities.

F. Identifying Schemas with URNs

The invention offers a solution to the problems addressed above. In an embodiment of the invention, schemas are identified by static, location independent names. In a preferred embodiment, these identifiers include Uniform Resource Names, or URNs. Uniform Resource Names are described in RFC 2079. URNs are names for resources which may reside on LANs, WANs, or on the Internet. These names are characterized by two signal features:

1) URNs are static. As explained in RFC 2141, URNs are designed to last indefinitely, irrespective of changes in the configuration of the computer system on which the resources identified by URNs reside. This is in stark contrast to network addresses, IP addresses, or file locations, all of which identify physical locations on a network, and are invalid if the physical locations change.

2) URNs are location independent. This also contrasts with network addresses and file locations. A system resource identified by a URN will retain that URN even if its network location changes, which does not hold true for its IP address, LAN address, or file location.

In an embodiment of the invention, each schema is identified with a URN. This is illustrated in FIG. 2. The document instance 208 of type PurchaseOrder identifies the schemas PurchaseOrder.sox 200, ContactAddress.sox 204, and CBL.sox 216, by their respective URN identifiers 210, 212, 214. Likewise, the definitions for PurchaseOrder.sox 200 and ContactAddress.sox 204 identify CBL.sox 216 by its URN identifiers 202 206.

The syntax of URNs is specified in RFC 2141. They are specified in the following format:

<URN>::="urn:"<NID>":"<NSS> where <NID> is a Namespace Identifier, and <NSS> is a Namespace Specific String. An illustration of a URN is provided by the URN for the PurchaseOrder.sox 200 schema in the invention, which is given by:

urn::x-commerceone:document:com:commerceone:marketsite:businessservices:PO.sox$1.0 wherein the NID is x-commerceone and the NSS is document:com:commerceone:marketsite:businessservices:PO.sox$1.0

When an XML processor reads a schema, the processor locates the schema from the URN. This requires resolving the URN to a physical location, such as a network location, URLs, or file location. As such, embodiments of the invention also include a method for resolving URNs to physical locations.

G. Resolving URNs via a Registry

In an embodiment of the invention, URNs are mapped to physical locations by converting the URNs to URIs, or Uniform Resource Identifiers. Uniform Resource Identifiers, which are described in RFC 2396, identify physical locations for computer system resources. URIs may take the form of network locations such as HTTP, FTP, or Telnet sites, or file locations within a computer system. To resolve URNs to physical locations, the present embodiment maps URNs to URIs, and correspondingly maps permanent, location independent identifiers to actual physical locations. The method used for this mapping should be scalable, in order to facilitate the addition of new schemas and document types to the marketplace, and should allow for easy retrieval and updating, as the network locations of the schemas may change frequently. Moreover, the mapping method should enable each server in the marketplace with an XML Processor 302, i.e., buyer sites 102, seller sites 104, transaction servers 108, to access the schemas, and interpret documents. As such, the method of URN resolution should also be accessible to each server in the marketplace.

Embodiments of the invention address these issues by employing a registry for mapping URNs to URIs. The registry resides on a directory service which is accessible by any site in the electronic marketplace, i.e., by any of the trading partner sites or any of the transaction servers within the transaction services network. FIG. 1 depicts this feature of the electronic marketplace. The buyer sites 102, seller sites 104, and the transaction servers 108 all communicate with the URN registry in the Directory Server 110. This layout lends scalability to the system, as any transaction servers or trading partner servers may also communicate with the registry.

To resolve the URNs by use of the registry, an access protocol is needed to retrieve the schema name from the x.500 directory. An embodiment of the invention utilizes the Lightweight Directory Access Protocol, or LDAP. The LDAP v3 protocol is a client-server protocol for performing lookups on a remote directory server. In the invention, the protocol is used to enable the transaction servers and trading partners to retrieve resource locations via the registry.

Figure 3:
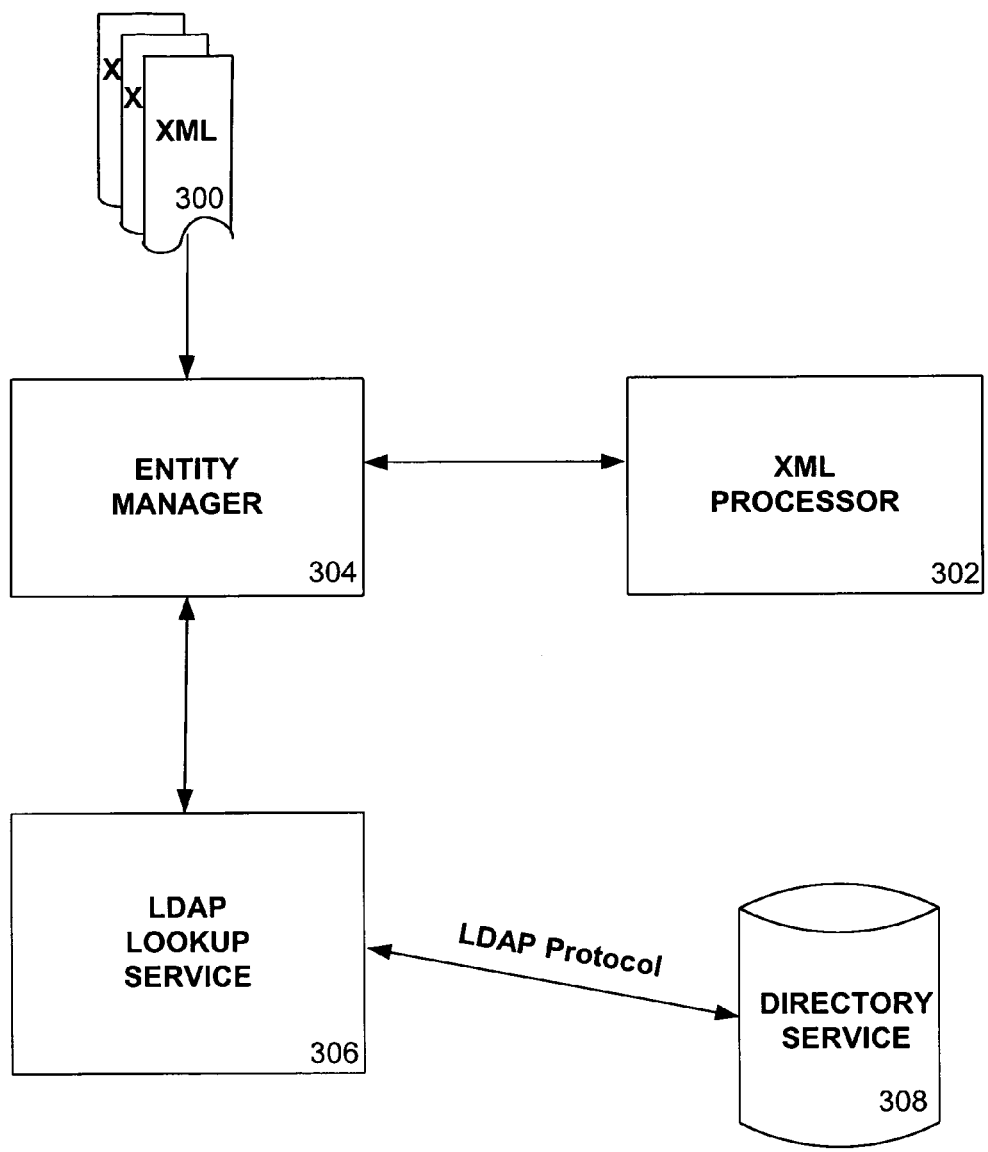
FIG. 3 illustrates the applications responsible for parsing XML documents in an embodiment of the invention.

FIG. 3 depicts the use of LDAP to retrieve schema locations from a directory. An Entity Manager 304 receives an XML document instance 300. The entity manager is an application which may run on any transaction server or trading partner site: the application manages XML document streams and facilitates the opening and tracking of URI based resources which the XML document system requires or references. The information collected by the Entity Manager 304 is passed to an XML Processor 302, which is responsible for understanding well-formed XML syntax. Upon parsing the XML document instance 300, the XML Processor 302 sends a URN for the schema to the Entity Manager 304. The Entity Manager 304 engages an LDAP Lookup Service 306 which searches for a URI corresponding to the URN in a directory service 308.

In an embodiment, the LDAP compliant directory service 308 used to resolve the URNs comprises an X.500 server. In alternative embodiments, the directory service 308 may be any other type of directory service which has functionality similar to LDAP v3. The X.500 directory server is described in detail in RFC 2253. In an LDAP compliant directory service such as X.500, the directory service stores primary keys as "Distinguished Names", which are commonly referred to as "DN"s. A DN is composed of a string of attribute values. The types of attributes include:

CN Common Name

OU Organization Unit Name

O Organization Name

A DN comprises a string of one or more attribute values for the attribute types listed above. The attribute types are organized in a tree-based hierarchy, which facilitates the search and retrieval of distinguished names. In the invention, the DN serves as the primary key for retrieving a corresponding URN from the x.500 directory.

Prior to using the DN as a key for retrieving a corresponding URI for a schema, the URN for that schema should be mapped to the DN. This step is performed by use of an LDAP URL. The LDAP URL standard is described in RFC 2255. This standard specifies a syntax for converting URNs to Distinguished Names. In an embodiment of the invention, the Entity Manager 304 is responsible for converting the URN to an LDAP URL. The Distinguished Names are then available to the LDAP protocol to search LDAP compliant directories. The search through the directory is performed by the LDAP Lookup Service 306.

The schema retrieval procedure outlined above comprises the following steps:

1) Take the input URN, perform a mapping to an LDAP URL
2) Take the LDAP URL from step 1 and convert to a DN to search the LDAP directory.
3) Locate the URI corresponding to the URN by searching the LDAP directory with the DN.
4) Locate and retrieve the schema by use of the URI The steps of this procedure shall be illustrated by the following, non-limiting example, in which a schema is retrieved from its URN.

H. Example

Retrieving a Purchase Order Schema from its URN

In this example, a PurchaseOrder.sox 200 schema is to be retrieved by an XML Processor 302. The URN for PurchaseOrder.sox 200 is specified as:

urn::x-commerceone:decument:com:commerceone:marketsite:businessservices:PO.sox$1.0 which comprises the following components:

NI=x-commerceone

NSS=document:com:commerceone:marketsite:businessservices:PO.sox$1.0

In an embodiment of the invention, the Namespace Identifier, or NI, for all schemas is "x-commerceone." The Namespace Specific String, or NSS, is divided into two parts, one representing the "logical directory" and the other portion representing the version of the document. These two portions of the NSS are delimited by the "$" token. Hence the logical directory is given by document:com:commerceone:marketsite:businessservices:PO.sox and the version is given as 1.0

The logical directory is a hierarchical name for the document which is delimited by colons ":". This hierarchy corresponds to the hierarchy in the LDAP directory relative to a Schema Root in reverse order. The Schema Root is a Distinguished Name representing the logical origin for the schema entries in the directory tree. In this example, the Schema Root is given by:

ou=schema, o=Marketplace B

The next step is to convert the URN as specified above into a corresponding LDAP URL. The format for a standard LDAP URL, as specified is RFC 2255, is given as follows:

Ldapurl=scheme"://[hostport]["/"[DN["?"[attributes]["?" [scope]["?"[filter]["?" extensions]]]]]

The parameters used in the mapping are "Scheme", "hostport", and "DN". The scheme in this case, equals "LDAP". The hostport will be given as "/". This token indicates to the Entity Manager 304 that the host and port will be resolved at during the directory lookup. The DN for the Purchase Order in the present example will be:

cn=PO.sox,
ou=n1_0
ou=businessservices
ou=marketsite
ou=commerceone
ou=com

The remaining parameters in the LDAP definition are not used. Hence the LDAP URL for the Purchase Order should be LDAP:///cn=PO.sox,ou=n1_0,ou=businessservices, ou=marketsite,ou=commerceone,ou=com An example of an algorithm which performs the mapping is given as follows:

1) Initialize string variable for storing the output LDAP URL
2) Insert "LDAP:///" into the variable
3) Remove the prefix "urn:x-commerceone:document" from the input URN. If this prefix is not present, then trigger an exception
4) Parse each token in the URN delimited by ":".
5) Insert each token into a LIFO buffer
6) The remaining portion of the input URN is the version component. Remove the "$" delimiter and store the remainder as a version string.
7) If the string is not "1.0", the schema is not version compliant, so trigger an exception
8) Remove the first token from the LIFO buffer and store into a string variable labeled "DocName"
9) Create a string for the DN by inserting the DocName string preceded by "cn=" and terminated with ","
10) If the version string starts with a digit, it is prefixed with "n" and the "." is replaced with a "_". In the present example, the version string "1.0" will be mapped to "n1_0"
11) Append the modified version string to the DN prefixed by "ou=" and terminated with ","
12) For each token in the LIFO buffer, prefix the token with "ou=", terminate the token with "," and append the modified token to the DN string. The final token in the LIFO buffer should be terminated with "."
13) Insert the DN string into the LDAP URL The result of the mapping algorithm applied to the current URN is LDAP:///cn=PO.sox,ou=n1_0,ou=businessservices, ou=marketsite,ou=commerceone,ou=com The DN embedded in the LDAP URL is used to by an LDAP Lookup Service 306 to search the x.500 directory.

Figure 4:
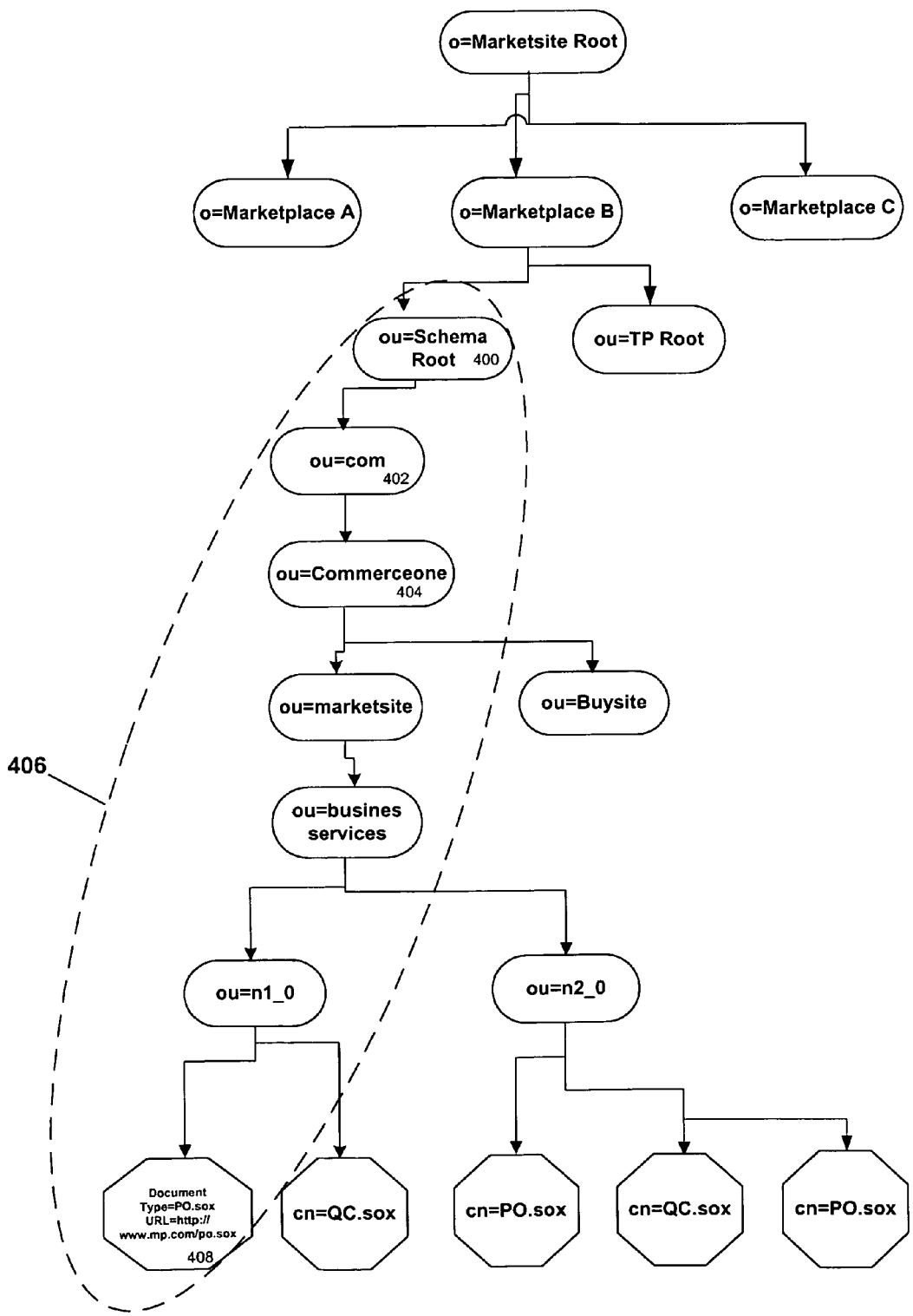
FIG. 4 illustrates an LDAP directory tree used to resolve URNs in an embodiment of the invention.

FIG. 4 is an illustration of the directory tree. The nodes of the tree correspond to attributes in the DN, and the leaves contain URIs for various schemas. The LDAP Lookup Service uses the third "/" as an indication of the host and port, which brings it to the Schema Root Node 400. The DN is now traversed in reverse order. The "ou=com" attribute brings us to the corresponding node in the LDAP tree 402. The next attribute is ou=commerceone, which has a corresponding node 404. The path 406 can be seen to correspond directly to the DN specified in the LDAP URL, wherein each attribute "ou" has a corresponding node in the path 406. The search ends at the leaf node 408, which contains the desired URI, which in this case, is http://www.mp.com/po.sox The schema retrieval system described in this example meets the criteria which were established earlier, such as persistence and location-independence, and exhibits a number of virtues which may not be immediately apparent. These features merit further elaboration.

I. Advantages of the Invention

Amongst the criteria listed for the schema identifier are persistence and location independence. The persistence and location independence of the URN is achieved by the provision of a centralized URN Repository which is easily updated. The registry, in an embodiment of the invention, is an x.500 directory, with a directory tree as given in FIG. 4. A physical location for a given resource can be updated simply by updating the corresponding leaf node. For instance, suppose the location of the Purchase Order schema in the example above is changed to http://www.marketsite.net/foo. This can be facilitated simply by replacing the current contents of the leaf node 408 with the new URL. Hence the corresponding URN is persistent, for the URN remains constant even though the old URL is obsolete. The URN is also location independent, as the physical location of the resource is at a new network location while the URN has remained constant. Thus, any documents referring to the schema by the URN remain valid under the location change.

Maintaining a centralized URN Repository lends scalability, integrity, and flexibility to the schema retrieval system. The provision of a centralized repository eliminates a need for replicated lists of schema locations. This frees memory in the system for other uses. The centralized repository also contributes to the scalability of the system, as any new server added to the system can access schemas simply by accessing the URN Repository. The elimination of replicated lists also preserves the integrity of the schema locations, for the system makes updates to the registry relatively simple, as elaborated above, and the centralized nature of the repository eliminates the possibility of contradictory location information for schemas. Embodiments of the invention also expedite schema retrieval. Because the URN Repository is stored in a directory tree, the search for the network location is faster than a flat file repository by a logarithmic factor.

Additionally, the object-oriented features supported by the enhanced schema language of the present invention enable the safe extension and evolution of elements defined in the language. Type extension allows elements to be defined as extensions of pre-existing elements. Polymorphism allows the extended elements to be used in contexts reserved for the original elements. By coupling polymorphism with type extension, the schema language enables type safe extensions at runtime. Thus document types and applications can evolve separately on the transaction services network.

As such, the extension mechanisms in the schema language allow trading partners to modify existing document types easily while preserving the integrity of document instances and applications that rely on the original document types. Trading partners can modify or extend existing document types to accommodate novel transactions while preserving the integrity of applications that rely on the original document types. Thus the enhanced schema language lends flexibility in creating and modifying transactions while preserving the integrity of existing applications on the transaction services network.

J. Alternative Embodiments

An alternative embodiment for the repository includes a federated directory service, in which the individual nodes of the directory service reside on separate servers. In an embodiment of the invention, schemas unique to particular trading partners are stored on sites which are operated by the trading partners. For instance, a particular buyer may modify a PurchaseOrder schema to suit their requirements. In an embodiment of the invention, those nodes of the LDAP tree which lead to a leaf with the URI for the modified PurchaseOrder reside on sites under the control of the buyer. This embodiment enables the buyer site to update nodes leading to a particular schema location itself, without going through a central directory service. As such, this embodiment decentralizes the process of updating the Directory Service, while preserving the integrity of the directory and eliminating the need for replicated URN repositories.

K. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method of extending a definition of a first tag used in a first electronic document, wherein the first electronic document is encoded in a markup language, and the first electronic document is stored on a server in a computer network, the method comprising:
    defining the first tag in a first schema, wherein the definition of the first tag includes a plurality of elements from the markup language;
    defining a second tag in a second schema, wherein a definition of the second tag includes
        a reference to the first tag in the first schema, wherein the reference identifies the first tag as being extended; and
        an additional element from the markup language; and
    providing references for locating the first schema and second schema in a second electronic document, wherein the second tag is polymorphically used to encode text within the second electronic document;
    whereby the first and second schemas respectively allow use of the first or second tag and applications and document types that use the first or second tag can evolve separately;
    wherein the markup language is XML.

2. The method of claim 1, further comprising:
    parsing the first electronic document, wherein the first electronic document is parsed by a parser for the markup language, the parser being stored on the server.

3. The method of claim 1, wherein the first electronic document corresponds to at least one of a purchase order, a purchase order acknowledgement, an order status check, an availability check, a price check, an invoice, an invoice acknowledgement.

4. The method of claim 1, further comprising:
    parsing the second electronic document, wherein the second electronic document is parsed by a parser for the markup language, the parser being stored on the server.

5. The method of claim 4, wherein the second electronic document corresponds to a commercial transaction.

6. The method of claim 5, wherein the commercial transaction is selected from the group consisting of a purchase order, a purchase order acknowledgement, an order status check, an availability check, a price check, an invoice, an invoice acknowledgement.

7. A computer network system including at least one processor for processing a document instance of a markup language, the computer network system comprising:
    means for defining a first tag, including a plurality of elements from a markup language, in a first schema in the computer network system;
    means for polymorphically extending a definition of the first tag by use of a second schema residing on the computer network system, the second schema defining a second tag by reference to the first tag that incorporates in the second schema the plurality of elements from the markup language and by including additional elements, including using the second tag in a location otherwise used by the first tag in the document instance; and
    means for importing reference to the second schema into the document instance;
    wherein the markup language is XML.

8. A method of extending a definition of a first tag used in a first electronic document, wherein the first electronic document is encoded in a markup language, and the first electronic document is stored on a server in a computer network, the method comprising:
    defining the first tag in a first schema, wherein a definition of the first tag includes plurality of elements from the markup language; and
    defining a second tag in a second schema, wherein a definition of the second tag includes a reference to the first tag and an additional element from the markup language; and
    providing references for locating the first schema and second schema in the first electronic document, wherein the first and second tags are polymorphically available to encode text within the first electronic document;
    whereby an application designed to work with the first tag in the first schema can process the text encoded using the second tag in the second schema, when the encoding is within the scope of the first tag, without modifying the application, whereby document types and applications can evolve separately;
    wherein the markup language is XML.

9. The method of claim 8, wherein the first and second schemas reside on separate servers.

* * * * *